Oct. 22, 1940.   J. S. ALSPAUGH   2,218,838

POWER TRANSMISSION MECHANISM

Filed July 27, 1938

Inventor
James S. Alspaugh
Attorneys

Patented Oct. 22, 1940

2,218,838

UNITED STATES PATENT OFFICE 2,218,838

POWER TRANSMISSION MECHANISM

James S. Alspaugh, Portsmouth, Ohio

Application July 27, 1938, Serial No. 221,559

8 Claims. (Cl. 74—298)

This invention relates to power transmitting means and while it, as shown herein, is particularly adapted for driving motor vehicles it can be used or modified for other purposes.

One object of the invention is to provide an improved mechanism in which the power is multiplied to start and maintain the drive by means of levers and fulcra in the form of journaled planetary gears engaging a rotary drum and the power and driven shaft.

Other objects will appear from the disclosure herein.

The invention is embodied in the example herein shown and described the feature of novelty being finally claimed.

In the accompanying drawing—

Figure 1:
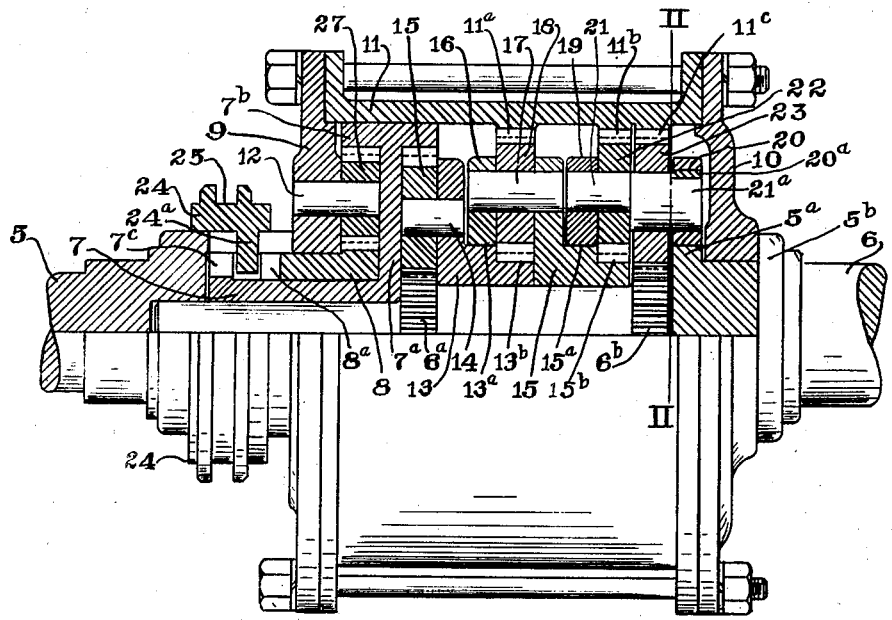
Figure 1 is a longitudinal section of the upper half of the mechanism the lower half being in external elevation and the mechanism in said lower half being a continuation and symmetrical inversion of what is shown in the upper half.

Referring now to the drawing, it will be observed that a driving shaft 6 extends to the right and may be driven by any suitable source of power such for example as an engine or other prime mover. The driving shaft 6 projects through the transmission unit and is suitably journalled in the end of a driven shaft 5 in a known manner. A cylindrical housing 11 having suitable radially extending end plates 9 and 10 surrounds a portion of the driving shaft 6 and is held in place by suitable means such for example as the longitudinally extending bolts illustrated.

Figures 2, 3:
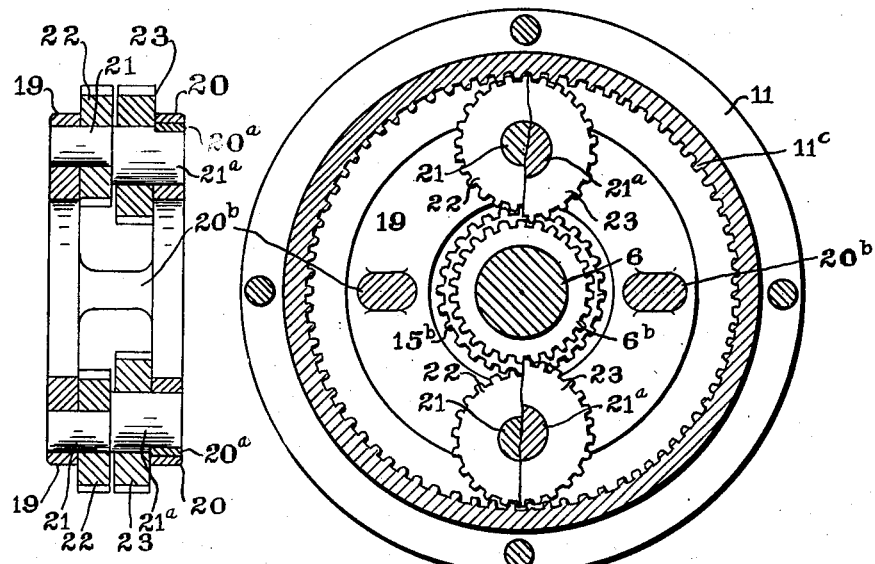
Fig. 2 is a transverse section of the mechanism on the line II—II, Fig. 1 with parts broken out.
Fig. 3 is a detail view of the ring frame for carrying the gears that clutch and drive the driven shaft.

A plurality of suitably spaced gears 6a and 6b are carried by the driving shaft 6, and cooperate with suitable gear means interposed in the cylindrical housing 11 to transmit power from the driving shaft 6 to the driven shaft 5 in a manner hereinafter more fully described. A plurality of spaced rotatable interconnected gear carrying members 19 and 20 are provided to interpose suitable planet gears 23 between the gear 6b carried by the driving shaft 6, and an internal gear 11c carried by the cylindrical housing 11. The gears 23 are carried on shaft portions 21a of spaced shafts 21 supported in the gear carrying members 19 and 20, and fixed relative to the member 20 preferably by means of a key 20a. The portions 21 of the shafts to the left of the shaft portions 21a are as illustrated in Figures 1 and 3 of smaller diameter and carry spaced planet gears 22 of suitable diameter to mesh with internal gears 11b carried by the cylindrical housing 11. The planet gears 22 mesh with a peripheral sun gear 15b of suitable diameter carried by an angular sleeve 15 mounted on the driving shaft 6, preferably intermediate the gears 6a and 6b. The angular sleeve 15 is provided with a shoulder portion 15a which receives the gear carrying member 19.

A plurality of spaced shafts 17 which carry a plurality of spaced planet gears 18 are suitably journaled at one end in the angular gear carrying sleeve 15, and at the other end in the supporting ring 16. The planet gears 18 mesh with an internal gear 11a carried by the cylindrical housing 11 and with an external gear 13b of suitable diameter carried by another angular sleeve 13 mounted on the driving shaft 6, preferably intermediate the gears 6a and 6b. The angular sleeve 13 is provided with a shoulder 13a which supports the ring 16 as illustrated.

The angular sleeve 13 carries a plurality of spaced stub shafts 14 which are provided with a plurality of spaced pinions 15 of suitable diameter supported to engage the gear 6a carried by the driving shaft 6. The pinions 15 at their outer edges mesh with an internal ring gear carried by a cylindrical drum 7b mounted on a radially extending flange 7a which is carried by a sleeve 7 surrounding the driving shaft 6 preferably beyond the anchor gear 6a.

An auxiliary sleeve 8 is interposed between the sleeve 7 and the radially extending end plate 9 as illustrated is provided to effect a reverse drive mechanism to drive the driven shaft 5 in reverse direction. The sleeve 8 is formed with external gear teeth which engage a plurality of spaced pinions 27 mounted on stub shafts 12 carried by the radially extending end plate 9. The pinions 27 engage an internal ring gear carried by the cylindrical drum 7b supported by the radially extending flange 7a.

The sleeve 7 is provided with radially extending teeth 7c, and the sleeve 8 is provided with axially extending teeth 8a preferably in line with the teeth 7c. Means including a gear clutch element 24 having inwardly extending gear teeth 24a is provided to interconnect the driven shaft 5 and the sleeve 7 through the teeth 7c to drive the driven shaft in forward direction, or to interconnect the driven shaft 5 with the sleeve 8 through the teeth 8a to drive the driven shaft 5 in reverse direction.

In the operation of this device, when it is desired to drive the driven shaft 5 in the same direction as the driving shaft 6, the gear clutch element 24 is moved to the left thereby interconnecting the driven shaft 5 with the sleeve 7 surrounding the driving shaft 6. The sleeve 8 and the pinions 27 may then rotate freely about the sleeve 7 surrounding the driving shaft 6.

Rotation of the driving shaft 6 operates through the gear 6b to rotate the pinions 23 about the drive shaft 6 or to rotate the cylindrical housing 11 about the drive shaft 6 by means of the internal gear 11c carried by the cylindrical housing 11. The pinions 22 meshing with the internal gear 11b of the housing 11 and being mounted on the shafts 21 will move with the pinions 23 and be driven at a different speed than the pinions 23.

The pinions 22 meshing with the peripheral sun gear 15b drives the angular gear carrying sleeve 15 at a speed dependent on the variation of the diameters of the gears which drive it. Movement of the angular gear carrying sleeve 15 operates through the pinion gears 18 which mesh with the internal gear 11a of the cylindrical housing 11 to drive the peripheral sun gear 13b carried by the angular gear carrying sleeve 13. The pinions or planet gears 15 carried by the angular sleeve 13 mesh with the gear 6a carried by the driving shaft 6 and drive the cylindrical drum 7b carried by the radially extending flange 7a to transmit power through the sleeve 7 and gear clutch elements 24 to drive the driven shaft 5 in the same direction as the driving shaft 6 at a different speed dependent on the gear ratio of the various gears comprising the driving gear train.

When it is desired to drive the driven shaft 5 in the reverse direction, the gear clutch elements 24 are shifted axially and the gears 24a engage the gears 8a of the sleeve 8. The drive through the device is the same as in forward drive up to the point where the spaced pinions 15 are driven to drive the cylindrical drum 7b. In reverse drive, the drum 7b drives the spaced pinions 27 carried on the stub shafts 12 mounted in the end plate 9. The pinions 27 drive the sleeve 8 rotatably mounted on the sleeve 8 to drive the driven shaft 5 in reverse direction through the clutch element 24. The speed of rotation imparted to the driven shaft 5 in reverse is of course dependent on the gear ratio of the gears comprising the driving gear train.

The form and number of parts can be modified or varied without departing from the spirit of the invention.

What I claim is:

1. In a transmission mechanism a shaft having affixed thereto two annular gears, one of said gears being an anchoring gear, a cylindrical drum mounted to turn on said shaft, said drum provided with annular internal gear teeth, a planet gear engaged with said anchoring gear, and a planet gear engaged with the teeth of the said drum, and a companion planet gear eccentrically mounted as respects the axis of the last mentioned planet gear and engaging the teeth of the drum and the other annular gear of the shaft.

2. In a transmission mechanism a shaft having affixed thereto two annular gears, one of said gears being an anchoring gear, a cylindrical drum mounted to turn on said shaft, said drum provided with annular internal gear teeth, a planet gear engaged with said anchoring gear, and a planet gear engaged with the teeth of the said drum, and a companion planet gear eccentrically mounted as respects the axis of the last mentioned planet gear and engaging the teeth of the drum and the other annular gear of the shaft, and cooperating reduction gearing between the first and last mentioned gears.

3. In a transmission mechanism a shaft having affixed thereto two annular gears, one of said gears being an anchoring gear, a cylindrical drum mounted to turn on said shaft, said drum provided with annular internal gear teeth, a planet gear engaged with said anchoring gear, and a planet gear engaged with the teeth of the said drum, and a companion planet gear eccentrically mounted as respects the axis of the last mentioned planet gear and engaging the teeth of the drum and the other annular gear of the shaft, and a rigid annular frame slidingly supporting said companion planet gears.

4. In a transmission mechanism a shaft having affixed thereto two annular gears, one of said gears being an anchoring gear, a cylindrical drum mounted to turn on said shaft, said drum provided with annular internal gear teeth, a planet gear engaged with said anchoring gear, and a planet gear engaged with the teeth of the said drum, and a companion planet gear eccentrically mounted as respects the axis of the last mentioned planet gear and engaging the teeth of the drum and the other annular gear of the shaft, and selective means for reversing the direction of motion of said transmission mechanism.

5. A power transmission mechanism including a power shaft and a driving shaft, said driving shaft having affixed thereto an annular anchoring gear and an annular driving gear, a cylindrical drum having internal gears, said drum mounted to turn on said driving shaft, a planet gear engaged with said anchoring gear and means operating on the power shaft for receiving drive from said planet gear, and planet gears engaged with the internal gears of said cylindrical drum, one of said last named gears being eccentrically mounted on the shaft of the gear next to it and engaged with the driving gear of the driving shaft.

6. A power transmission mechanism including a power shaft and a driving shaft, said driving shaft having affixed thereto an annular anchoring gear and an annular driving gear, a cylindrical drum having internal gear teeth, said drum carrying a spur gear and mounted to turn on said driving shaft, a planet gear engaged with said anchoring gear, planet gears engaged with the said internal gear teeth of the cylindrical drum, one of said last named gears being eccentrically mounted relative to the other of the last named gears and engaged with the said driving gear of the driving shaft, and means for receiving drive from said planet gears including an angular sleeve having a vertical portion provided with a cross rim internally gear toothed at opposite sides of said vertical portion, one of said internally toothed rim portions engaging the planet gear engaging the aforesaid anchoring gear, and the other toothed rim portion engaging the spur gear carried by the drum and means for selectively transmitting power from said rim portions to the driven shaft in forward or reverse direction.

7. In a transmission, a driving shaft having a plurality of spaced gears, a driven shaft, a cylindrical housing having spaced internal ring gears surrounding the driving shaft, planetary gear means interposed between one of the spaced gears carried by the driving shaft and one of said spaced ring gears, a plurality of spaced gear carrying sleeves mounted on the driving shaft intermediate said spaced gears, a driving sleeve having a ring gear spaced therefrom carried by the driving shaft, a plurality of sets of spaced planetary gear means interposed between the spaced gears carried by the driving shaft, at least one of said sets of planetary gears meshing with one of the internal ring gears carried by the cylindrical housing and another of said sets interconnecting one of the gears carried by the driving shaft and the ring gear carried by the driving sleeve, and clutch means between the driving sleeve and the driven shaft.

8. In a transmission, a driving shaft having a plurality of spaced gears, a driven shaft, a cylindrical housing having spaced internal ring gears surrounding the driving shaft, planetary gear means interposed between one of the spaced gears carried by the driving shaft and one of said spaced ring gears, a plurality of spaced gear carrying sleeves mounted on the driving shaft intermediate said spaced gears, a driving sleeve having a radially extending flange supporting spaced ring gears on its opposite sides carried by the driving shaft, a plurality of sets of spaced planetary gear means interposed between the spaced gears carried by the driving shaft, at least one of said sets of planetary gears meshing with one of the internal ring gears carried by the cylindrical housing and another of said sets interconnecting one of the gears carried by the driving shaft and one of the ring gears carried by the driving sleeve, a reverse driving sleeve surrounding the driving sleeve, planetary gear means interposed between the reverse driving sleeve and the other of the ring gears carried by the driving sleeve, and clutch means between the reverse driving sleeve and the driven shaft to drive the driven shaft in the opposite direction.

JAMES S. ALSPAUGH.